United States Patent
Choe et al.

(10) Patent No.: US 12,250,709 B2
(45) Date of Patent: Mar. 11, 2025

(54) ELECTRONIC DEVICE FOR DETERMINING RECEPTION DIMENSION AND OPERATION METHOD THEREOF

(71) Applicant: Samsung Electronics Co., Ltd., Suwon-si (KR)

(72) Inventors: Balgeum Choe, Suwon-si (KR); Chanhong Kim, Suwon-si (KR); Seunghui Hong, Suwon-si (KR); Hyunjong Na, Suwon-si (KR); Hyungju Nam, Suwon-si (KR); Changkee Min, Suwon-si (KR); Hanjun Park, Suwon-si (KR); Heenam Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 17/750,981

(22) Filed: May 23, 2022

(65) Prior Publication Data
US 2022/0386322 A1 Dec. 1, 2022

Related U.S. Application Data

(63) Continuation of application No. PCT/KR2022/003473, filed on Mar. 11, 2022.

(30) Foreign Application Priority Data

May 26, 2021 (KR) .......................... 10-2021-0067685
Sep. 16, 2021 (KR) .......................... 10-2021-0124345

(51) Int. Cl.
*H04W 72/542* (2023.01)
*H04B 7/08* (2006.01)
(Continued)

(52) U.S. Cl.
CPC ......... *H04W 72/542* (2023.01); *H04L 1/0003* (2013.01)

(58) Field of Classification Search
CPC ... H04W 72/542; H04W 52/24; H04W 72/04; H04W 52/14; H04W 52/36;
(Continued)

(56) References Cited

U.S. PATENT DOCUMENTS 6,404,821 B1 6/2002 Dent
9,960,882 B2 * 5/2018 Svedman .............. H04L 1/0025
(Continued)

FOREIGN PATENT DOCUMENTS

JP        6671762 B2      3/2020
KR   10-2008-0043671 A   5/2008
(Continued)

OTHER PUBLICATIONS

Ali Fatih Demir et al., Waveform Design for 5G and Beyond, arXiv:1902.05999v1, Feb. 15, 2019, pp. 1-22, Retrieved from URL: https://arxiv.org/pdf/1902.05999.pdf [retrieved on May 11, 2022].
(Continued)

*Primary Examiner* — Harry H Kim
(74) *Attorney, Agent, or Firm* — Jefferson IP Law, LLP

(57) ABSTRACT

An electronic device and a method are provided. The electronic device includes communication circuitry configured to receive signals from at least one user equipment (UE), and a processor, wherein the processor may be configured to determine a reception quality of a signal obtained through the communication circuitry, obtain an offset corresponding to a channel characteristic of the signal, determine, based on the offset indicating a signal quality difference corresponding to a difference between a reception dimension (Rx dimension) at signal reception and a target Rx dimension and the reception quality, an expected recep-
(Continued)

tion quality corresponding to the target Rx dimension, pre-schedule the target Rx dimension and a frequency resource to the at least one UE, determine an expected throughput for the at least one UE based on the expected reception quality, determine the target Rx dimension, and receive or transmit data from or to the UE.

15 Claims, 11 Drawing Sheets

(51) Int. Cl.
*H04B 17/336* (2015.01)
*H04L 1/00* (2006.01)
*H04L 1/20* (2006.01)
*H04L 5/00* (2006.01)
*H04L 25/02* (2006.01)
*H04W 52/14* (2009.01)
*H04W 52/36* (2009.01)
*H04W 72/04* (2023.01)

(58) Field of Classification Search
CPC ... H04L 1/0003; H04L 25/0224; H04L 5/006; H04L 1/0009; H04B 7/0452; H04B 7/0456; H04B 17/336
See application file for complete search history.

(56) References Cited

U.S. PATENT DOCUMENTS

| | | | |
|---|---|---|---|
| 10,039,062 B2 * | 7/2018 | Kim | H04W 52/365 |
| 2010/0005186 A1 * | 1/2010 | Yamada | H04N 21/44209 709/231 |
| 2015/0373736 A1 | 12/2015 | Ji et al. | |
| 2018/0102817 A1 | 4/2018 | Park et al. | |
| 2018/0159604 A1 | 6/2018 | Won et al. | |
| 2020/0295891 A1 | 9/2020 | Koh et al. | |
| 2022/0078099 A1 * | 3/2022 | Zhohov | H04W 24/08 |
| 2022/0123800 A1 * | 4/2022 | Li | H04L 5/0091 |

FOREIGN PATENT DOCUMENTS

| | | |
|---|---|---|
| KR | 10-2018-0064319 A | 6/2018 |
| KR | 10-2062902 B1 | 2/2020 |
| KR | 10-2087039 B1 | 3/2020 |
| WO | 2017/105126 A1 | 6/2017 |

OTHER PUBLICATIONS

Sandra Lagen et al., New Radio Physical Layer Abstraction for System-Level Simulations of 5G Networks, arXiv:2001.10309v2. Apr. 19, 2021, pp. 1-7, Retrieved from URL: https://arxiv.org/pdf/2001.10309.pdf [retrieved on May 11, 2022].

International Search Report and Written Opinion dated Jun. 17, 2022, issued in International Patent Application No. PCT/KR2022/003473.

Hwang et al., Slow antenna selection and fast link adaptation MIMO systems, XP031244962, Mar. 31, 2008.

Wu et al., Effective data rate based rank adaptive receive antenna selection, XP032872575, Dec. 6, 2015.

Zhang et al., Adaptive receive antenna selection for orthogonal space-time block codes with channel estimation errors, XP010882708, Nov. 28, 2005.

European Search Report dated Oct. 15, 2024, issued in European Application No. 22811452.6.

* cited by examiner

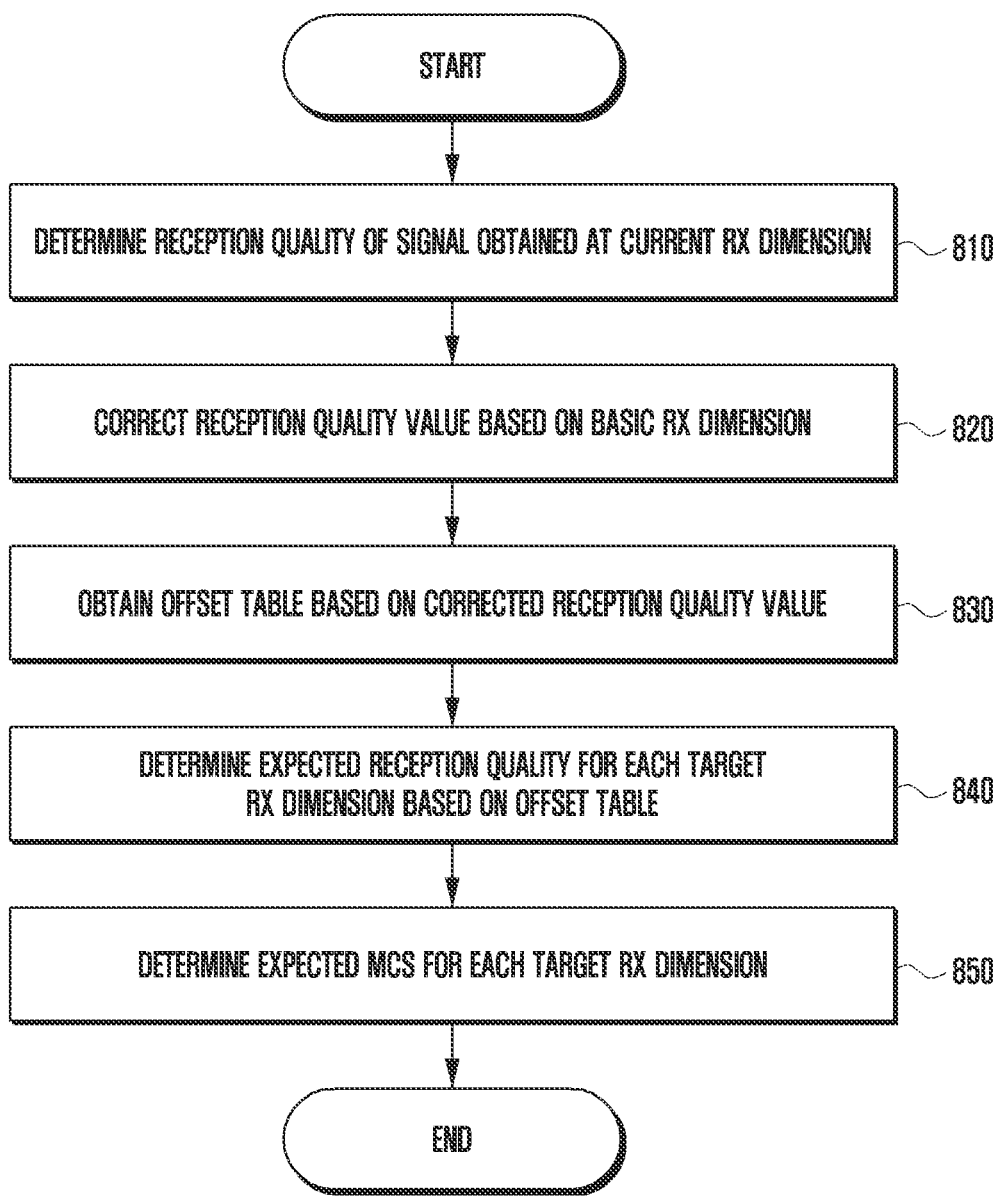

ELECTRONIC DEVICE FOR DETERMINING RECEPTION DIMENSION AND OPERATION METHOD THEREOF

CROSS-REFERENCE TO RELATED APPLICATION(S)

This application is a continuation application, claiming priority under § 365(c), of an International application No. PCT/KR2022/003473, filed on Mar. 11, 2022, which is based on and claims the benefit of a Korean patent application number 10-2021-0067685, filed on May 26, 2021, in the Korean Intellectual Property Office, and of a Korean patent application number 10-2021-0124345, filed on Sep. 16, 2021, in the Korean Intellectual Property Office, the disclosure of each of which is incorporated by reference herein in its entirety.

TECHNICAL FIELD

The disclosure relates to an electronic device determining a reception dimension and an operation method thereof. More particularly, the disclosure relates to an electronic device and operation method thereof for determining a reception dimension outputting a maximum throughput in an open radio access network (O-RAN) system where the radio unit (RU) and the digital unit (DU) are separated.

BACKGROUND ART

To meet the ever increasing demand for wireless data traffic since the commercialization of $4^{th}$ generation (4G) communication systems, efforts have been made to develop improved $5^{th}$ generation (5G) or pre-5G communication systems. As such, 5G or pre-5G communication systems are also called "beyond 4G network system" or "post long-term evolution (LTE) system". To achieve high data rates, 5G communication systems are being considered for implementation in the extremely high frequency (mmWave) band (e.g., bands above 6 GHz) in addition to the band used by LTE (bands below 6 GHz). Various technologies including beamforming, massive multiple-input multiple-output (massive MIMO), full dimensional MIMO (FD-MIMO), array antennas, analog beamforming, and large scale antennas are considered for 5G communication systems.

The base station providing mobile communication services has been implemented in an integrated form in which a digital unit (DU) and a radio unit (RU) of the base station are installed together in a cell site. However, since the base station in which the DU and the RU are implemented in an integrated form is not suitable for the needs of mobile communication operators who want to build a number of cell sites according to an increase in users and traffic, a cloud radio access network (C-RAN) architecture has emerged to remedy this.

The C-RAN has a structure in which DUs are intensively arranged in one physical place, and only RUs are left in cell sites that transmit and receive radio signals to and from actual terminals, and the DUs and RUs may be connected through optical cables or coaxial cables. Further, as RUs and DUs are separated, interface standards for communication between them are required, and currently, standards such as common public radio interface (CPRI) are being used between the RU and the DU.

Currently, wire-based common public radio interface (CPRI), open base station architecture initiative (OBSAI), open radio interface (ORI) standards have been developed as fronthaul standards, and the CPRI standard, which can transmit radio section transmission signals, RU control management signals, and synchronization signals at high speed, is mainly used.

A base station implemented with the current C-RAN/fronthaul structure cannot satisfy fronthaul requirements including data rate and bandwidth. To solve this problem, options to split the functionality of the base band unit (BBU) and remote radio head (RRH) differently from now are being considered internationally. Currently, various functional splitting options have been proposed, and each option has advantages and disadvantages in terms of fronthaul bandwidth reduction, coordinated multi-point transmission and reception (CoMP) effect, and RAN virtualization gain. According to the CPRI standard, the bit error rate (BER) of the fronthaul must be less than $10^{-12}$ for both user plane data and control plane data, and the error vector magnitude (EVM) should not exceed 17.5% in quadrature phase shift keying (QPSK) and 8% in 64 quadrature amplitude modulation (QAM) for LTE signals.

In addition, such a base station architecture is being standardized in the 3rd Generation Partnership Project (3GPP), and an open radio access network (O-RAN) being an open network standard applicable to 5G systems is under study.

The O-RAN system is a network system implemented based on the O-RAN standard that logically separates functions that can be performed by the base station (e.g., (evolved Node B (eNB)) of an existing 4th generation mobile communication system and the base station (e.g., next generation Node B (gNB)) of a 5th generation mobile communication system. The international organization leading the open RAN (O-RAN) is the O-RAN Alliance. Major base station vendors, including major global mobile carriers, are also participating to develop standard technologies in connection with 3GPP standards.

The above information is presented as background information only to assist with an understanding of the disclosure. No determination has been made, and no assertion is made, as to whether any of the above might be applicable as prior art with regard to the disclosure.

DISCLOSURE

Technical Problem

The open radio access network (O-RAN) system may logically divide functions performed within the base station. Some functions may be implemented to be processed in a radio unit (RU) of the base station (gNB), and some other functions may be implemented to be processed in a digital unit (DU) of the base station. According to an embodiment, the DU may perform a function of processing baseband signals (e.g., functional split 7-2).

When the O-AN system includes a large number of receive antennas in the RU using spatial resources for the purpose of increasing the data rate, the DU may receive a baseband signal corresponding to signals received by all antennas. The bandwidth required by the interface implemented between the DU and the RU increases as the number of antennas connected to the RU increases. However, the maximum bandwidth supported by the interface implemented between the DU and the RU may be smaller than the required bandwidth. When the RU reduces the bandwidth of signals transmitted to the DU by performing pre-combining on signals within the capacity of the interface between the RU and the DU, the array gain and diversity gain obtained through spatial resources may be decreased, and the performance of the base station may be reduced.

Aspects of the disclosure are to address at least the above-mentioned problems and/or disadvantages and to provide at least the advantages described below. Accordingly, an aspect of the disclosure is to provide an electronic device and operation method thereof that determine an optimal reception dimension between the RU and the DU in response to a channel environment and a scheduling situation in a limited interface environment between the DU and the RU.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module configured to receive signals from at least one user equipment (UE), and a processor, wherein the processor may be configured to determine a reception quality of a signal obtained through the communication module, obtain an offset corresponding to a channel characteristic of the signal, determine, based on the offset indicating a signal quality difference corresponding to a difference between a reception dimension (Rx dimension) at signal reception and a target Rx dimension and the reception quality, an expected reception quality corresponding to the target Rx dimension, pre-schedule the target Rx dimension and a frequency resource to the at least one UE, determine an expected throughput for the at least one UE based on the expected reception quality corresponding to the target Rx dimension and a size of the frequency resource, determine the target Rx dimension based on the expected throughput, and receive or transmit data from or to the UE through the determined target Rx dimension.

In accordance with another aspect of the disclosure, an operation method of the electronic device is provided. The method includes determining a reception quality of a signal obtained through a communication module, obtaining an offset corresponding to a channel characteristic of the signal, determining, based on the offset corresponding to a target Rx dimension and the reception quality, an expected reception quality corresponding to the target Rx dimension, pre-scheduling the target Rx dimension and a frequency resource to at least one UE, determining an expected throughput for the at least one UE based on the expected reception quality corresponding to the target Rx dimension and the size of the frequency resource, and determining an optimal Rx dimension based on the expected throughput.

Advantageous Effects

According to various embodiments, the electronic device may adaptively change the reception dimension according to channel environments to thereby improve the performance of the O-RAN system.

According to various embodiments, the electronic device may adaptively change the reception dimension according to scheduling situations to thereby improve the performance of the O-RAN system.

According to various embodiments, the electronic device may not perform reception dimension reduction according to a channel environment and scheduling situation, and may preserve the array gain and diversity gain obtained through spatial resources.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 8 is a flowchart for the DU to determine a reception quality based on a pre-scheduled reception dimension according to an embodiment of the disclosure;

Throughout the drawings, it should be noted that like reference numbers are used to depict the same or similar elements, features, and structures.

MODE FOR DISCLOSURE

Figure 1:
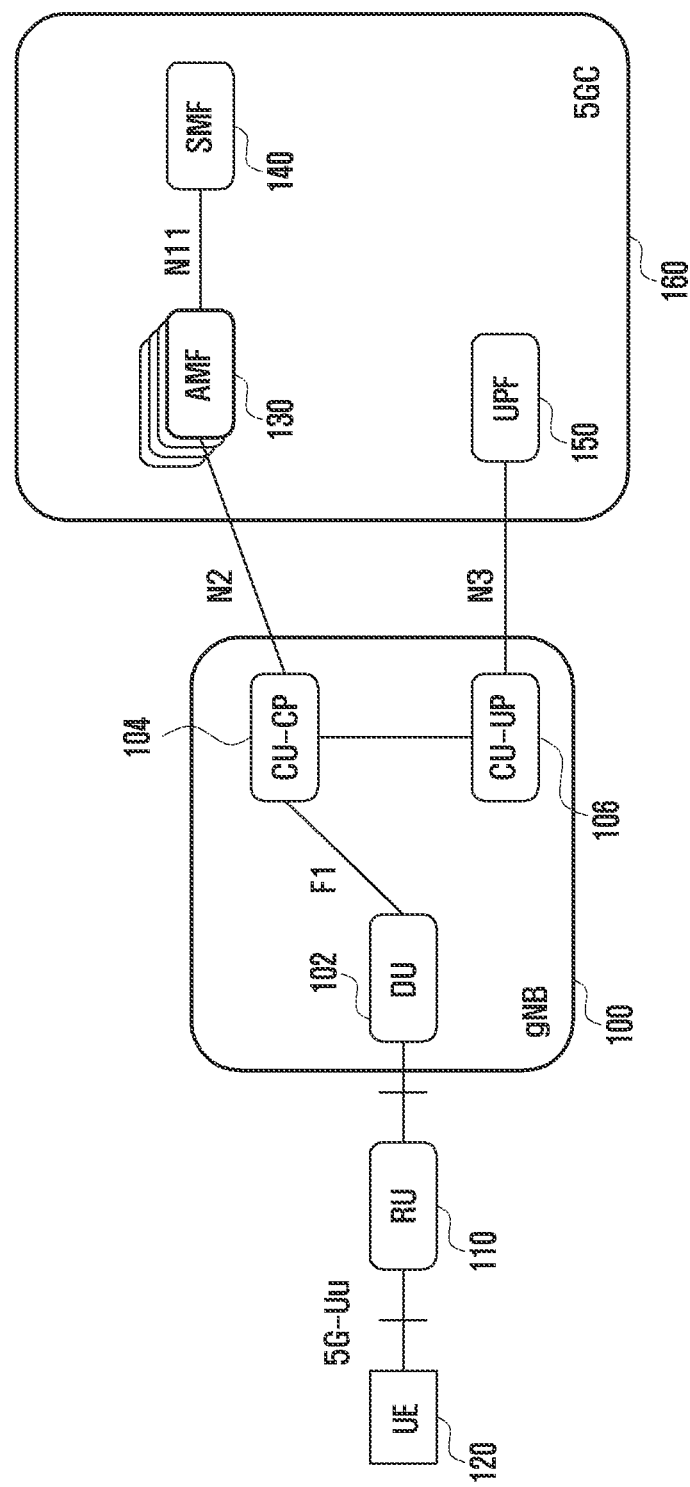
FIG. 1 is a diagram showing an example of a fifth generation (5G) new radio (NR) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the term "uplink (UL)" refers to a radio link through which the terminal sends data or a control signal to the base station, and the term "downlink (DL)" refers to a radio link through which the base station sends data or a control signal to the terminal. Further, the term "base station (BS)" refers to a main agent allocating resources to terminals and may be at least one of evolved Node B (eNode B), Node B, next generation Node B (gNode B, gNB), radio access unit, base station controller, or network node. The term "terminal" may refer to user equipment (UE), mobile station (MS), cellular phone, smartphone, computer, or multimedia system with a communication function.

To meet the demand for wireless data traffic, fifth generation communication systems have been commercialized so as to provide users with high data rate services through 5G systems together with fourth generation (4G) systems, and it is expected that wireless communication services with various purposes, such as Internet-of-Things and high-reliability services with specific purposes, can be provided.

The open radio access network alliance (O-RAN alliance) established by operators and equipment providers to support network systems in which current 4G communication systems and 5G systems are mixed has defined new network elements (NEs) and interface standards based on the existing third generation partnership project (3GPP) standards, so that the open radio access network (O-RAN) architecture has emerged. In the O-RAN, existing 3GPP NEs RU, DU, central unit-control plane (CU-CP), and central unit-user plane (CU-UP) are redefined respectively as O-RU, O-DU, O-CU-CP, and O-CU-UP (these can be collectively referred to as an O-RAN base station), and near-real-time RAN intelligent controller (RIC) and non-real-time RAN intelligent controller (NRT-RIC) are standardized in addition. Ethernet can be connected between the O-DU and the RIC, between the O-CU-CP and the RIC, and between the O-CU-UP and RIC. In addition, interface standards are required for communication between the O-DU and the RIC, between the O-CU-CP and the RIC, and between the O-CU-UP and the RIC, and currently, standards such as E2-DU, E2-CU-CP and E2-CU-UP may be used between O-DU, O-CU-CP, O-CU-UP and RIC.

FIG. 1 is a diagram showing an example of a 5G NR core system according to an embodiment of the disclosure.

Referring to FIG. 1, a core network 160 may include network functions including access and mobility management function (AMF) 130, session management function (SMF) 140, and user plane function (UPF) 150. The elements in the core network 160 may be components implemented physically or in software.

According to various embodiments of the disclosure, the AMF 130 may provide a function for access and mobility management for each UE 120. The AMF 130 may perform a registration procedure of the UE 120 on the cellular communication network, mobility management of the UE 120 (e.g., identifying the location of the UE 120), and connection management between the UE 120 and the cellular communication network.

According to various embodiments of the disclosure, the SMF 140 may perform session management operations such as session establishment, modification or release, and UE IP address assignment, and procedures for data transmission or reception between the UE 120 and the core network 160.

According to various embodiments of the disclosure, the UPF 150 may receive user data transmitted from the UE 120 via the base station 100 and transmit the received user data to an external server. The UPF 150 may transmit user data received from an external server to the UE 120 via the base station 100.

According to various embodiments of the disclosure, the base station 100 (e.g., 5G mobile communication base station (gNB), 4G mobile communication base station (eNB)) may include, as a logical function, at least one component among RU (radio unit) 110 performing physical layer functions, digital unit (DU) 102 responsible for medium access control (MAC) and radio link control (RLC) functions, central unit-control plane (CU-CP) 104 and central unit-user plane (CU-UP) 106 responsible for higher functions such as radio resource control (RRC) and packet data convergence protocol (PDCP). The components of the base station 100 may be components implemented physically or in software.

According to various embodiments of the disclosure, the CU-CP 104 may be a component that performs a function related to the control plane. The CU-CP 104 may be a component that performs functions related to connection setup between the UE 120 and the base station 100, mobility and security of the UE 120.

According to various embodiments of the disclosure, the CU-UP 106 may perform functions related to the user plane such as user data transmission and reception. The base station 100 is connected to the AMF 130, and one or more instances of the AMF 130 may be implemented on the core network 160.

Figure 2:
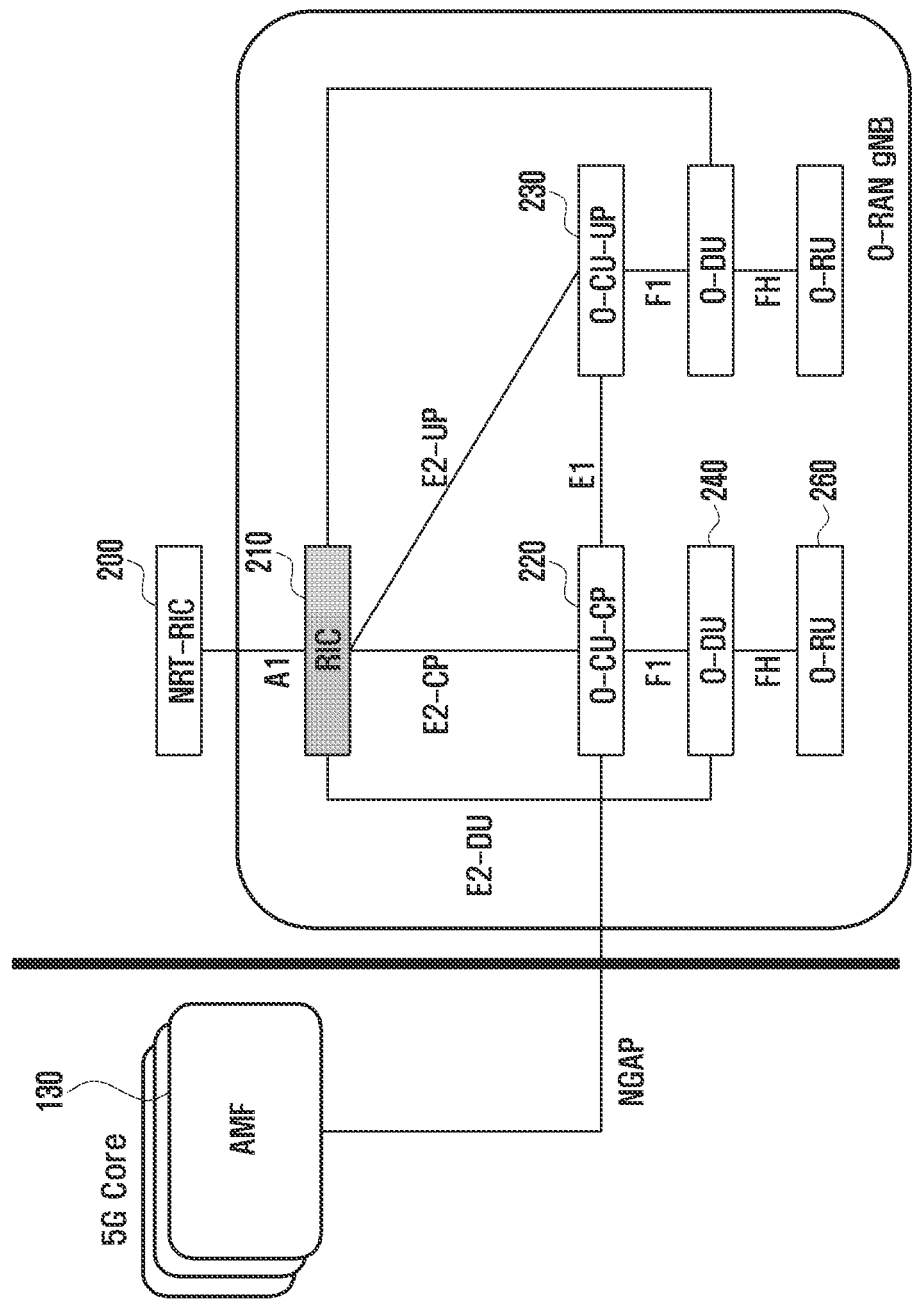
FIG. 2 is a diagram illustrating an example of an open radio access network (O-RAN) system according to an embodiment of the disclosure.

FIG. 2 is a diagram illustrating an example of an open radio access network (O-RAN) system according to an embodiment of the disclosure.

Referring to FIG. 2, the O-RAN system may be a network system implemented based on the O-RAN standard that logically separates the functions that can be performed by a base station (eNB) of a 4G mobile communication system and a base station (gNB) of a 5G mobile communication system.

In the RAN standard, non-real time RAN intelligent controller (NRT-RIC) 200, near-real-time RAN intelligent controller (RIC) 210, O-CU-CP 220, O-CU-UP 230, O-DU 240, and O-RU 260 are newly defined.

The O-CU including the O-CU-CP 220 and the O-CU-UP 230 is a logical node that provides the functions of radio resource control (RRC), service data adaptation protocol (SDAP), and packet data convergence protocol (PDCP), where the O-CU-CP 220 is a logical node that provides control plane functions of the RRC and PDCP, and the O-CU-UP 230 is a logical node that provides user plane functions of the SDAP and PDCP. The O-CU-CP 220 is connected to the access and mobility management function (AMF) included in the 5G network (5G core) through an NGAP interface.

According to various embodiments of the disclosure, the O-DU 240 may be a logical component that provides RLC, MAC and high physical layer (high-PHY, which is based on fronthaul split 7-2x) functions. Although not shown in FIG. 2, the O-RU connected to the O-DU 240 may be a logical component that provides low physical layer (low-PHY, which is based on fronthaul split 7-2x) functions and RF processing functions (e.g., amplification and/or modulation of signals).

The O-RU 260 connected to the O-DU 240 is a logical node that provides low-PHY and RF processing functions. Although each logical node is shown as a single instance in FIG. 2, a logical node can be connected in multiple instances. For example, a plurality of O-RUs 260 may be connected to one O-DU 240, and a plurality of O-DUs 240 may be connected to one O-CU-UP 230.

According to various embodiments of the disclosure, the NRT-RIC 200 may be a logical component that enables non-real-time control and optimization of RAN elements and resources, model training and update, and the like. The RIC 210 may be a logical component that enables near-real-time control and optimization of RAN elements and resources based on data collected through the E2 interface from the O-DU 240, the O-CU-CP 220, and the O-CU-UP 230.

The disclosure is not limited by the names of the components described above, and the configuration of the disclosure can be applied to logical components that perform the above-described functions. In addition, a logical component may be physically located at the same location or at different locations, and its function may be provided by the same physical device (e.g., processor, controller) or by different physical devices. For example, the function of at least one logical component described above may be provided by one physical device through virtualization.

Figure 3:
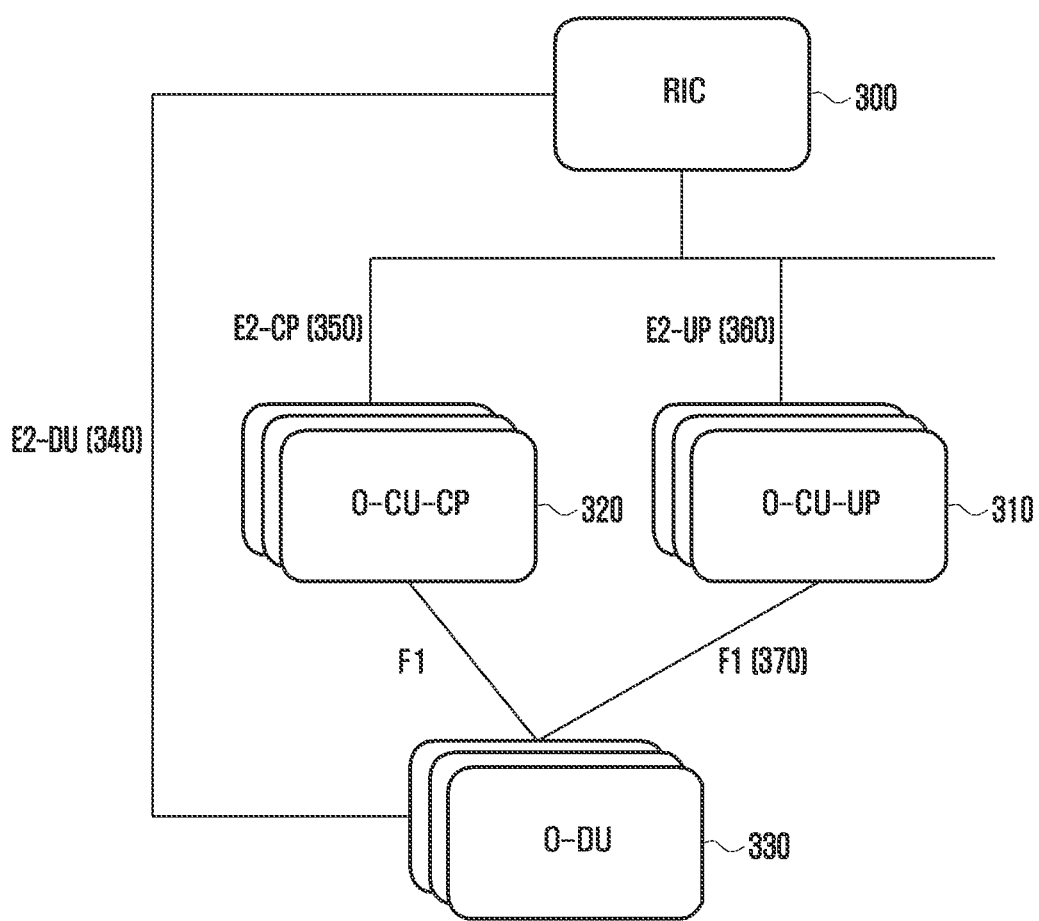
FIG. 3 is a diagram illustrating an example of connections between the radio access network (RAN) intelligent controller (RIC) and multiple O-RAN central unit control planes (O-CU-CPs), O-RAN central unit user planes (O-CU-Ups), and O-RAN distributed units (DUs) (O-DUs) in the O-RAN system according to an embodiment of the disclosure.

FIG. 3 is a diagram illustrating an example of connections between the RIC and multiple O-CU-CPs, O-CU-UPs, and O-DUs in the O-RAN system according to an embodiment of the disclosure.

Referring to FIG. 3, a RIC 300 may be connected to multiple O-CU-CPs 320, O-CU-UPs 310, and O-DUs 330. The interface between the RIC 300 and the O-DU 330 may be defined as E2-DU 340. The interface between the RIC 300 and the O-CU-CP 320 may be defined as E2-CP 350. The interface between the RIC 300 and the O-CU-UP 310 may be defined as E2-UP 360.

The interface between the O-CU-CP 320 and the O-DU 330 may be defined as F1. The interface between the O-CU-UP 310 and the O-DU 330 may be defined as F1 370.

Although one RIC 300 is shown in FIG. 3, the O-RAN system may be implemented to include multiple RICs. The plural RICs may be implemented with multiple pieces of hardware located at the same physical location or may be implemented through virtualization using one piece of hardware.

Figure 4:
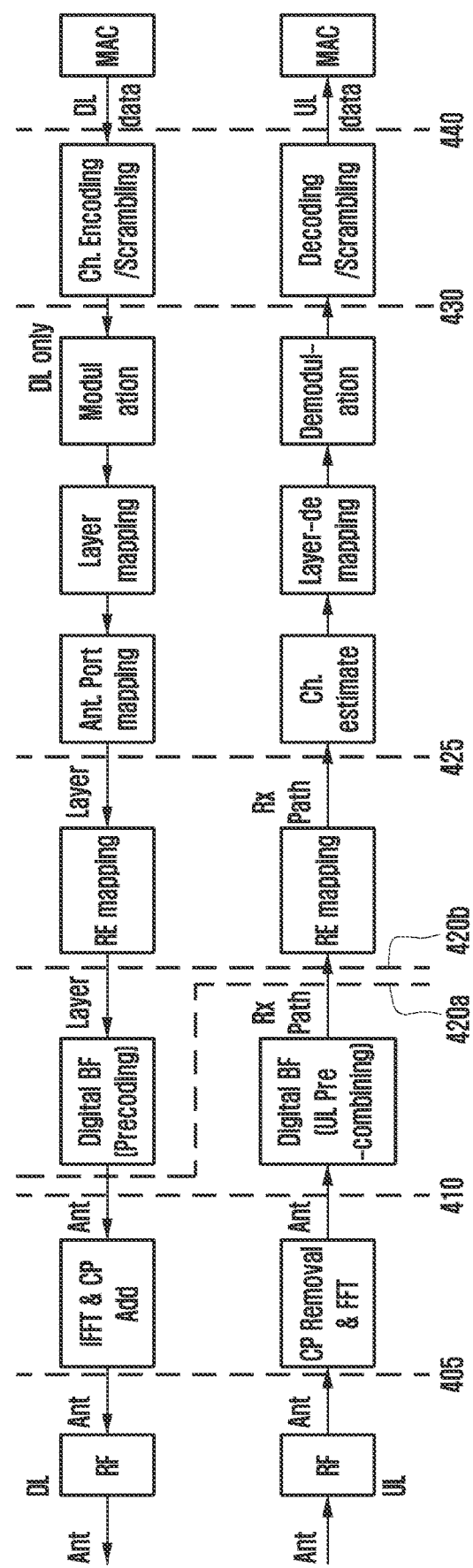
FIG. 4 is a diagram illustrating an example of functional splitting in a wireless communication system according to an embodiment of the disclosure.

FIG. 4 is a diagram illustrating an example of functional splitting in a wireless communication system according to an embodiment of the disclosure. With advances in wireless communication technology (e.g., introduction of 5G or new radio (NR) communication system), the frequency band used has further increased, and as the cell radius of the base station becomes very small, the number of RUs to be installed is further increased. In addition, in the 5G communication system, the amount of data to be transmitted is increased by 10 times or more, and the transmission capacity of the wired network transmitted through the fronthaul has greatly increased. Owing to these factors, the installation cost of a wired network in a 5G communication system may increase significantly. Therefore, to lower the transmission capacity of the wired network and reduce the installation cost of the wired network, techniques for lowering the transmission capacity of the fronthaul by transferring some functions of the modem of the DU to the RU have been proposed. In these techniques, to reduce the burden of the DU, a method of extending the role of the RU in charge of only RF functions to some functions of the physical layer is considered. In this case, as the RU performs higher layer functions, the throughput of the RU may increase to thereby decrease the transmission bandwidth at the fronthaul, and at the same time, the latency requirement constraint due to the response processing may be lowered. On the other hand, as the RU performs higher layer functions, the virtualization gain decreases and the size, weight and cost of the RU increase. It is required to implement optimal functional splitting in consideration of trade-offs between advantages and disadvantages described above.

Referring to FIG. 4, functional splits in the physical layer below the MAC layer are illustrated. In the case of downlink (DL) for transmitting a signal to the UE through the wireless network, the base station may perform, in sequence, channel encoding/scrambling, modulation, layer mapping, antenna mapping, resource element (RE) mapping, digital beamforming (e.g., precoding), inverse fast fourier transform (IFFT) transform/cyclic prefix (CP) insertion, and radio frequency (RF) conversion. In the case of uplink (UL) for receiving a signal from the UE through the wireless network, the base station may perform, in sequence, RF conversion, FFT transform/CP removal, digital beamforming (pre-combining), RE demapping, channel estimation, layer demapping, demodulation, and decoding/descrambling. Functional splits for uplink functions and downlink functions may be defined in various ways according to needs between vendors, discussions on the standards, and the like in consideration of the above-described trade-offs.

The first functional split 405 may be a separation between RF functions and physical layer (PHY) functions. The first functional split may indicate that PHY functions are not substantially implemented in the RU, and may be referred to as, for example, option 8. The second functional split 410 allows the RU to perform IFFT transform/CP insertion in downlink of PHY functions and FFT transform/CP removal in uplink of PHY functions, and allows the DU to perform the remaining PHY functions. For example, the second functional split 410 may be referred to as option 7-1. The third functional split 420*a* allows the RU to perform IFFT transformation/CP insertion in downlink of PHY functions and FFT transformation/CP removal and digital beamforming in uplink of PHY functions, and allows the DU to perform the remaining PHY functions. As an example, the third functional split 420*a* may be referred to as option 7-2x category A. The fourth functional split 420*b* allows the RU to perform up to digital beamforming in both downlink and uplink, and allows the DU to perform high-PHY functions after digital beamforming. As an example, the fourth functional split 420*b* may be referred to as option 7-2x category B. The fifth functional split 425 allows the RU to perform up to RE mapping (or, RE demapping) in both downlink and uplink, and allows the DU to perform high-PHY functions after RE mapping (or, RE demapping). As an example, the fifth functional split 425 may be referred to as option 7-2. The sixth functional split 430 allows the RU to perform up to modulation (or, demodulation) in both downlink and uplink, and allows the DU to perform high-PHY functions after modulation (or, demodulation). As an example, the sixth functional split 430 may be referred to as option 7-3. The seventh functional split 440 allows the RU to perform up to encoding/scrambling (or, decoding/descrambling) in both downlink and uplink, and allows the DU to perform high-PHY functions after modulation (or, demodulation). As an example, the seventh functional split 440 may be referred to as option 6.

In one embodiment, when large capacity signal processing is expected as in the FR1 MMU, a functional split at a relatively high layer (e.g., fourth functional split 420b) may be required to reduce the fronthaul capacity. Further, since a functional split at a too high layer (e.g., sixth functional split 430) may complicate the control interface and cause a burden on the implementation of the RU due to multiple PHY processing blocks included in the RU, appropriate functional splitting may be required depending on schemes for the arrangement and implementation of the DU and the RU.

In one embodiment, when it is not possible to process the precoding of data received from the DU (i.e., there is a limit to the precoding capability of the RU), the third functional split 420a or lower-layer functional split (e.g., second functional split 410) may be applied. Conversely, when there is a capability to process the precoding of data received from the DU, the fourth functional split 420b or higher-layer functional split (e.g., sixth functional split 430) may be applied. Hereinafter, various embodiments of the disclosure will be described with reference to the third functional split 420a or the fourth functional split 420b unless otherwise specified, but this does not exclude making an embodiment through other functional splits.

Figure 5:
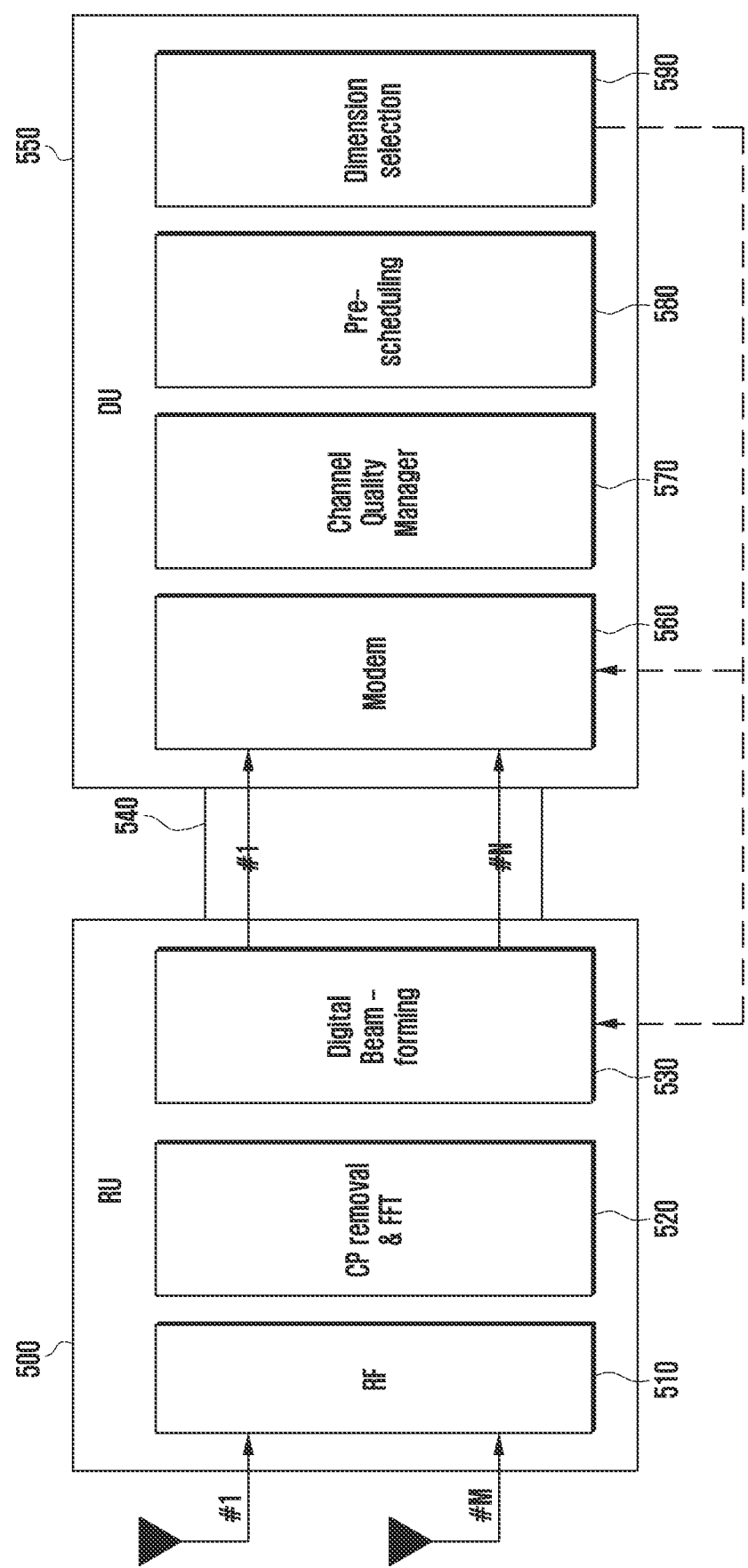
FIG. 5 is a diagram illustrating a structure of the radio unit (RU) and the digital unit (DU), and a fronthaul interface between the RU and the DU in an O-RAN system according to an embodiment of the disclosure.

FIG. 5 is a diagram illustrating a structure of an RU and a DU, and a fronthaul interface between the RU and the DU in an O-RAN system according to an embodiment of the disclosure.

The radio unit (RU) 500 according to various embodiments may correspond to the RU in FIG. 1 (e.g., RU 110 in FIG. 1). For example, referring to FIG. 5, an RU 500 may be a massive multiple-input multiple-output (MIMO) unit (MMU) including massive MIMO antennas.

The RU 500 according to an embodiment may be in charge of low-layer functions of the wireless network. For example, the RU 500 may perform some of PHY-layer functions, and RF functions. Here, some of PHY layer functions are performed at a relatively lower level than the DU 550 among the PHY-layer functions, and may include IFFT/FFT transform, CP insertion/removal, and digital beamforming for example. Hereinafter, only configurations and functions related to the uplink among the functions of the RU 500 may be described.

The RU 500 according to various embodiments may include an RF communication module 510, a frequency handling unit 520, and/or a digital beamforming unit 530.

The RF communication module 510 according to various embodiments may obtain a signal from at least one UE through an antenna.

The RF communication module 510 according to an embodiment may receive and/or transmit a signal from and/or to at least one UE through M massive MIMO antennas #1 to #M. For example, the RF communication module 510 may receive an uplink (UL) from at least one UE.

The RF communication module 510 according to an embodiment may perform RF conversion for the uplink. For example, the RF communication module 510 may convert an uplink in an analog form obtained from antennas into a digital form.

The frequency handling unit 520 according to various embodiments may process a signal obtained from the RF communication module 510.

The frequency handling unit 520 according to an embodiment may perform cyclic prefix (CP) removal and/or fast Fourier transform (FFT) on the signal received by the RF communication module 510. For example, the frequency handling unit 520 may convert a time domain signal into a frequency domain signal.

The digital beamforming unit 530 according to various embodiments may generate a combined signal by pre-combining at least one signal.

The digital beamforming unit 530 according to an embodiment may adjust the reception dimension (Rx dimension) (e.g., dimension reduction) through pre-combining. For example, by pre-combining M signals obtained from M antennas at a ratio of n:1, the Rx dimension received by the DU 550 may be adjusted to M/n Rx dimension.

The Rx dimension may correspond to the number of layers of a signal received by the digital unit (DU) 550 connected to the radio unit (RU) 500 over the fronthaul interface 540. For example, the Rx dimension may correspond to the number of signals that the DU 550 can receive and process. For example, the interface capacity of the fronthaul interface 540 may be greater than or equal to the value obtained by multiplying the Rx dimension and the system bandwidth together. Hence, the Rx dimension may be less than or equal to the value obtained by dividing the interface capacity by the system bandwidth. Here, the interface capacity may be a value according to the physical characteristics of the fronthaul interface 540 implemented between the RU 500 and the DU 550.

According to an embodiment, the digital beamforming unit 530 may pre-combine signals in correspondence to a specified Rx dimension and/or an optimal Rx dimension determined by the dimension selection unit 590. For example, when the specified Rx dimension and/or the optimal Rx dimension is N, the digital beamforming unit 530 may generate N combined signals by pre-combining M signals received through M antennas at a ratio of M/N:1.

The digital beamforming unit 530 according to an embodiment may transmit pre-combined signals to the DU 550 over the fronthaul interface 540. For example, the digital beamforming unit 530 may transmit N combined signals to the DU 550 through the fronthaul interface 540.

The DU 550 according to various embodiments may correspond to the DU in FIG. 1 (e.g., DU 102 in FIG. 1).

For example, the DU 550 may be in charge of high-layer functions of the wireless network. For example, the DU 550 may perform medium access control (MAC)-layer functions and some of PHY-layer functions. Here, some of PHY-layer functions are performed at a higher level among the PHY-layer functions, and may include channel encoding (or, channel decoding), scrambling (or, descrambling), modulation (or, demodulation), and layer mapping (or, layer demapping) for example. Hereinafter, only configurations and functions related to the uplink among the functions of the DU 550 may be described.

The DU 550 according to various embodiments may include a modem 560, a channel quality manager 570, a pre-scheduling unit 580, and/or a dimension selection unit 590.

The modem 560 according to various embodiments may process signals obtained from the RU 500 through the fronthaul interface 540. For example, the modem 560 may perform RE demapping, channel estimation, layer demapping, demodulation and/or decoding/descrambling on the obtained signals.

The modem 560 according to an embodiment may measure the reception quality of a processed signal. As an example, for signals obtained from at least one UE, the modem 560 may process a combined signal that has been pre-combined by the digital beamforming unit 530 in correspondence to the current Rx dimension, and measure the reception quality of the processed signal.

For example, the modem 560 may measure the reception quality of the received signal based on at least one method of reference signal received power (RSRP) for measuring signal strength by averaging the strength of reference signals belonging to a specific cell in a frequency band, received signal strength indication (RSSI), reference signal received quality (RSRQ) for measuring reception quality based on a value obtained by dividing RSRP by RSSI, signal to noise ratio (SNR) for measuring the quality of a signal based on a ratio of received signal to noise, or signal-to-interference-plus-noise ratio (SINR) for measuring reception quality based on the ratio of interference and noise to the received signal.

The channel quality manager 570 according to various embodiments may determine an expected reception quality in relation to a target Rx dimension.

The channel quality manager 570 according to an embodiment may determine the channel characteristics of an obtained signal. For example, the channel quality manager 570 may determine characteristics of the channel (e.g., channel model and/or electric field characteristic) based on a signal obtained from at least one UE.

The channel quality manager 570 according to an embodiment may obtain an offset stored in the memory (not shown). For example, the channel quality manager 570 may obtain an offset table corresponding to the channel characteristics. The offset may be a value corresponding to an expected reception quality difference in response to a difference between the current Rx dimension and the target Rx dimension.

Table 1 may be an example of an offset table according to an embodiment.

TABLE 1

| Current Rx dimension<br>Target Rx dimension | 4Rx Dimension | 8Rx Dimension | 16Rx Dimension |
| --- | --- | --- | --- |
| 4Rx Dimension | 0 | −3 dB | −6 dB |
| 8Rx Dimension | 3 dB | 0 | −3 dB |
| 16Rx Dimension | 6 dB | 3 dB | 0 |

For example, with reference to Table 1, when the current Rx dimension is 4 Rx dimension and the target Rx dimension is 8 Rx dimension, the channel quality manager 570 may obtain an offset value of 3 dB; when the current Rx dimension is 4 Rx dimension and the target Rx dimension is 16 Rx dimension, the channel quality manager 570 may obtain an offset value of 6 dB. According to an embodiment, the channel quality manager 570 may update the offset table based on the reception quality obtained from the modem 560.

The channel quality manager 570 according to an embodiment may determine the expected reception quality corresponding to the target Rx dimension based on the offset. For example, the channel quality manager 570 may determine the expected reception quality corresponding to the target Rx dimension by adding an offset value corresponding to the target Rx dimension to the reception quality at the current Rx dimension obtained from the modem 560. For instance, the channel quality manager 570 may determine the value obtained by adding the offset (e.g., 3 dB) corresponding to the target Rx dimension (e.g., 8 Rx dimension) to the reception quality (e.g., A) at the current Rx dimension (e.g., 4 Rx dimension) to be the expected reception quality (e.g., A+3 dB) at the target Rx dimension (e.g., 8 Rx dimension).

The channel quality manager 570 according to an embodiment may list expected reception qualities according to target Rx dimensions.

Table 2 may be an example of a list of expected reception qualities corresponding to target Rx dimensions according to an embodiment.

TABLE 2

| Target Rx dimension | Expected reception quality |
| --- | --- |
| 4Rx Dimension | A |
| 8Rx Dimension | A + 3 dB |
| 16Rx Dimension | A + 6 dB |

For example, with reference to Table 2, when the target Rx dimension is 4 Rx dimension, the channel quality manager 570 may determine the expected reception quality to be A; when the target Rx dimension is 8 Rx dimension, it may determine the expected reception quality to be A+3 dB; and when the target Rx dimension is 16 Rx dimension, it may determine the expected reception quality to be A+6 dB. The pre-scheduling unit 580 according to various embodiments may output an expected throughput by pre-scheduling resources according to the UE and target Rx dimension.

The pre-scheduling unit 580 according to an embodiment may pre-schedule a target Rx dimension and frequency resources to at least one UE. In this case, the value obtained by summing the products of target Rx dimensions and frequency resource sizes for the pre-scheduled plural UEs may be less than or equal to the interface bandwidth.

The pre-scheduling unit 580 according to an embodiment may determine an expected throughput for a pre-scheduled combination. For example, for at least one UE, the pre-scheduling unit 580 may determine the expected throughput on the basis of the expected reception quality corresponding to the pre-scheduled target Rx dimension (e.g., modulation coding scheme (MCS) level based on expected SINR) and the size of the pre-scheduled frequency resource block (resource block size). For instance, the pre-scheduling unit 580 may determine the sum of the expected throughputs for the pre-scheduled UEs to be the expected throughput for the pre-scheduled combination. For example, the pre-scheduling unit 580 may determine an expected throughput for a pre-scheduled combination according to Equation 1.

$$\text{expected } T-\text{put}_{N_{k,l}} = \sum_{k=0}^{K-1} TBS(MCS_{N_{k,l}}, RB_{N_{k,l}}) \qquad \text{Equation 1}$$

In Equation 1, $N_{k,l}$ may denote the target Rx dimension for UE k (UE #k) (l=1, 2, . . . ,), $MCS_{N_{k,l}}$ may denote the receivable MCS level (modulation and coding scheme level) when the target Rx dimension of UE k (UE #k) is 1, $RB_{N_{k,l}}$ may denote the size of the pre-scheduled frequency resource block (RB) size when the target Rx dimension of UE k (UE k) is 1, and TBS may denote a transport block (TB) size based on the MCS level and the size of the resource block.

For example, Equation 1 may be an equation for calculating the sum of TBS values when k is 0 to K−1 for UE k (UE #k) and the transport block size (TBS) based on the MCS level corresponding to the target Rx dimension of 1 and the size of the frequency resource block. For instance, the sum of TBS values obtained by Equation 1 may correspond to an expected throughput for the pre-scheduled combination.

When the number of UEs is greater than or equal to a specified number, the pre-scheduling unit 580 according to an embodiment may pre-schedule the same target Rx dimension to the plural UEs and determine the expected throughput based on the reception quality corresponding to the target Rx dimension (e.g., MCS level based on SINR) and the size of the pre-scheduled frequency resource block (resource block size, RBS). For example, the pre-scheduling unit 580 may determine the expected throughput according to Equation 2.

$$\text{expected } T-\text{put}_N = \sum_{k=0}^{K-1} TBS(MCS_{k,N}, RB_{k,N}) \quad \text{Equation 2}$$

In Equation 2, N may denote the target Rx dimension equally applied to UEs, $MCS_{k,N}$ may denote the receivable MCS level (modulation and coding scheme level) when the target Rx dimension of UE k (UE #k) is N, $RB_{k,N}$ may denote the size of the pre-scheduled resource block (RB size) when the target Rx dimension of UE k (UE #k) is N, and TBS may denote a transport block size based on the MCS level and the resource block size.

For example, Equation 2 may be an equation for calculating the sum of TBS values when k is 0 to K−1 for the target Rx dimension set to N and the transport block size (TBS) based on the MCS level of $k^{th}$ UE and the resource block size. For instance, the sum of TBS values obtained by Equation 2 may correspond to an expected throughput.

Table 3 is an example of expected throughputs determined for a target Rx dimension combination of at least one UE according to an embodiment.

TABLE 3

|  | Expected throughput |
|---|---|
| First combination | B |
| Second combination | C |
| Third combination | D |

For example, with reference to Table 3, the pre-scheduling unit 580 may determine the expected throughput to be B for a first combination (e.g., 4 Rx dimension and 9 RBs pre-scheduled to first UE, 8 Rx dimension and 4 RBs pre-scheduled to second UE, and 16 Rx dimension and 2 RBs pre-scheduled to third UE). The pre-scheduling unit 580 may determine the expected throughput to be C for a second combination (e.g., 8 Rx dimension and 5 RBs pre-scheduled to first UE, 8 Rx dimension and 4 RBs pre-scheduled to second UE, and 4 Rx dimension and 9 RBs pre-scheduled to third UE). The pre-scheduling unit 580 may determine the expected throughput to be D for a third combination (e.g., 4 Rx dimension and 4 RBs pre-scheduled to first UE, 4 Rx dimension and 10 RBs pre-scheduled to second UE, and 8 Rx dimension and 5 RBs pre-scheduled to third UE). The dimension selection unit 590 according to various embodiments may determine an optimal Rx dimension based on the expected throughput.

The dimension selection unit 590 according to an embodiment may determine an optimal Rx dimension of a signal in units of slots (e.g., a transmission time interval (TTI)).

The dimension selection unit 590 according to an embodiment may determine a combination having the highest expected throughput among the expected throughputs determined for target Rx dimension combinations of individual UEs as an optimal Rx dimension combination for the at least one UE.

The dimension selection unit 590 according to an embodiment may transmit information related to the optimal Rx dimension combination for at least one UE to the digital beamforming unit 530 and/or the modem 560. For example, the digital beamforming unit 530 may pre-combine one or more signals according to the optimal Rx dimension combination for at least one UE, and the modem 560 may process received signals according to the optimal Rx dimension combination for at least one UE.

Figure 6:
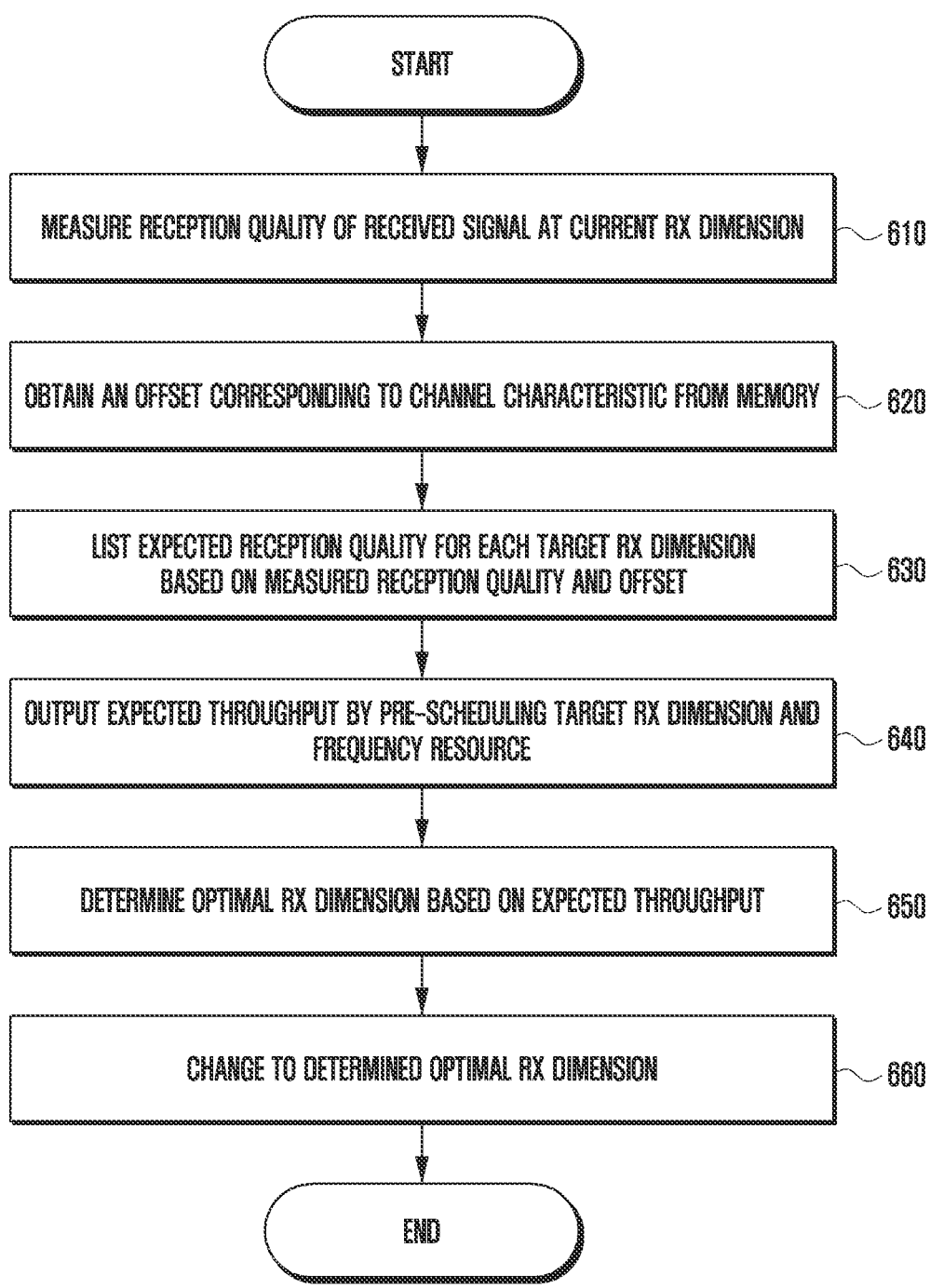
FIG. 6 is a flowchart for the DU to determine an optimal reception dimension according to an embodiment of the disclosure.

FIG. 6 is a flowchart for a DU to determine an optimal Rx dimension according to an embodiment of the disclosure.

Referring to FIG. 6, at operation 610, a DU 550 according to various embodiments may measure the reception quality of a received signal at the current Rx dimension.

The DU 550 according to an embodiment may measure the reception quality of an obtained signal. As an example, for signals obtained from at least one UE, the DU 550 may process a combined signal that has been pre-combined in correspondence to the current Rx dimension, and measure the reception quality of the processed signal.

For example, the DU 550 may measure the reception quality of a received signal based on at least one method of reference signal received power (RSRP) for measuring signal strength by averaging the strength of reference signals belonging to a specific cell in a frequency band, received signal strength indication (RSSI), reference signal received quality (RSRQ) for measuring reception quality based on a value obtained by dividing RSRP by RSSI, signal to noise ratio (SNR) for measuring the quality of a signal based on a ratio of received signal to noise, or signal-to-interference-plus-noise ratio (SINR) for measuring reception quality based on the ratio of interference and noise to the received signal.

At operation 620, the DU 550 according to various embodiments may obtain an offset corresponding to channel characteristics from the memory.

The DU 550 according to an embodiment may determine the channel characteristics of the obtained signal. For example, the DU 550 may determine channel characteristics (e.g., channel model and/or electric field characteristics) based on signals obtained from at least one UE.

The DU 550 according to an embodiment may obtain an offset stored in the memory (not shown). For example, the DU 550 may obtain an offset table corresponding to the channel characteristics.

At operation 630, the DU 550 according to various embodiments may determine the expected reception quality for each target Rx dimension based on the measured reception quality and the offset.

The DU 550 according to an embodiment may determine the reception quality corresponding to the target Rx dimension based on the offset. For example, the DU 550 may determine the expected reception quality corresponding to the target Rx dimension by adding an offset value corresponding to the target Rx dimension to the reception quality at the current Rx dimension.

The DU 550 according to an embodiment may list expected reception qualities according to target Rx dimensions.

At operation 640, the DU 550 according to various embodiments may determine an expected throughput by pre-scheduling a target Rx dimension and a frequency resource for at least one UE.

The DU 550 according to an embodiment may pre-schedule a target Rx dimension and a frequency resource for at least one UE. In this case, the value obtained by summing the products of target Rx dimensions and frequency resource sizes for the pre-scheduled plural UEs may be less than or equal to the interface bandwidth.

The DU 550 according to an embodiment may determine an expected throughput for the pre-scheduled combination. For example, for at least one UE, the DU 550 may determine the expected throughput on the basis of the expected reception quality corresponding to the pre-scheduled target Rx dimension (e.g., MCS level based on expected SINR) and the size of the pre-scheduled frequency resource block (resource block size). For instance, the DU 550 may determine the sum of the expected throughputs for the pre-scheduled UEs to be the expected throughput for the pre-scheduled combination. For example, the DU 550 may determine an expected throughput for a pre-scheduled combination according to Equation 1 and/or Equation 2.

At operation 650, the DU 550 according to various embodiments may determine an optimal Rx dimension based on the expected throughput.

The DU 550 according to an embodiment may determine a combination having the highest expected throughput among the expected throughputs determined for target Rx dimension combinations of individual UEs as an optimal Rx dimension combination for the at least one UE.

At operation 660, the DU 550 according to various embodiments may change the Rx dimension to the determined optimal Rx dimension.

The DU 550 according to an embodiment may transfer information about the optimal Rx dimension combination for at least one UE to the RU 500.

Figure 7A:
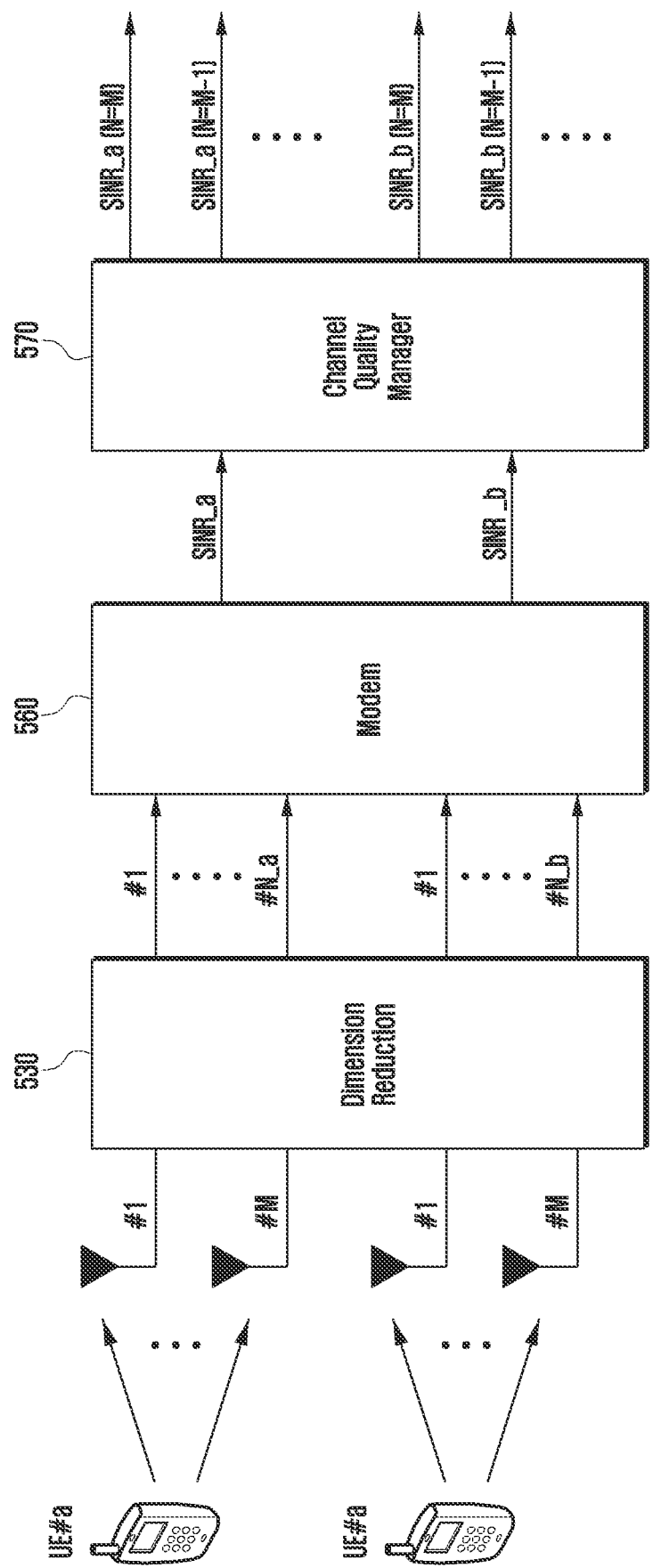
FIGS. 7A and 7B are diagrams for depicting an operation of determining an optimal reception dimension for each user equipment in an O-RAN system according to various embodiments of the disclosure.
Figure 7B:
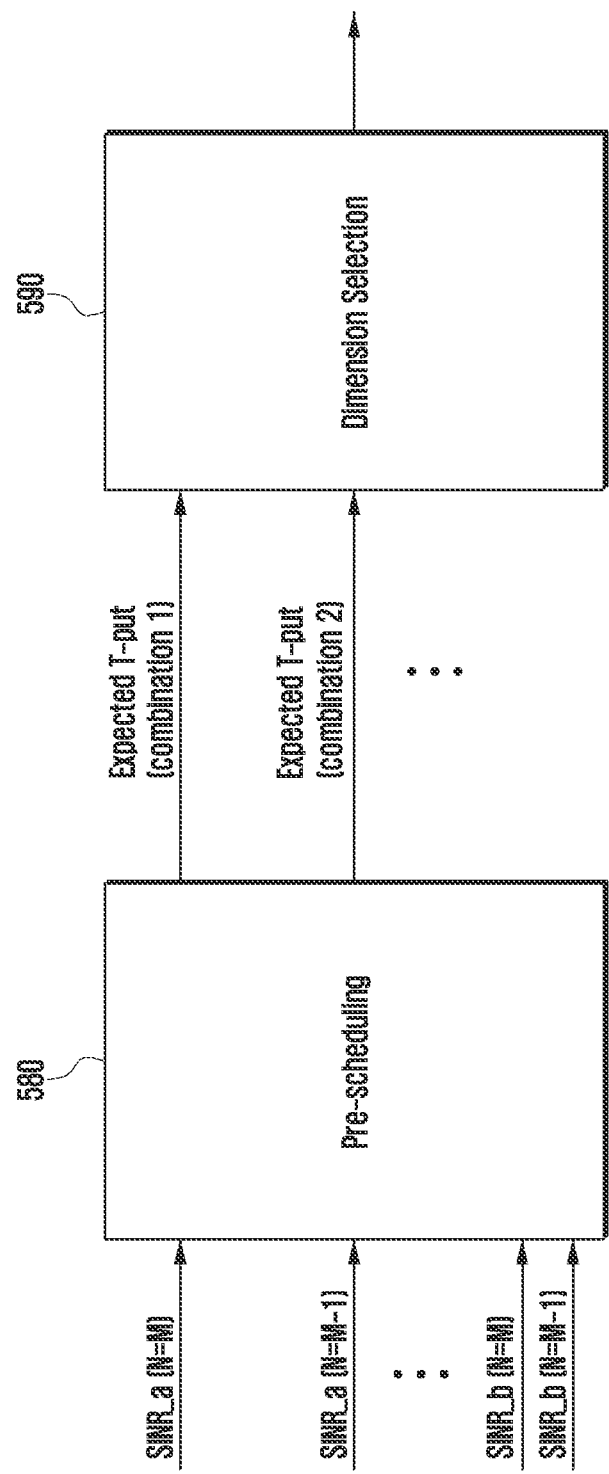

FIGS. 7A and 7B are diagrams for depicting an operation of determining an optimal Rx dimension for each UE in an O-RAN system according to various embodiments of the disclosure.

Referring to FIG. 7A, an O-RAN system may obtain signals from user equipment a (UE #a) and/or user equipment b (UE #b).

According to an embodiment, the O-RAN system may obtain signals from UE #a and/or UE #b through antennas #1 to #M.

The digital beamforming unit 530 according to various embodiments may pre-combine M signals obtained from each of UE #a and/or UE #b to generate a combined signal.

According to an embodiment, the digital beamforming unit 530 may pre-combine M signals obtained from each of UE #a and/or UE #b in correspondence to a specified Rx dimension and/or an optimal Rx dimension determined by the dimension selection unit 590. For example, when a specified Rx dimension and/or optimal Rx dimension is N, the digital beamforming unit 530 may generate N combined signals by pre-combining M signals received through M antennas at a ratio of M/N:1. For example, the digital beamforming unit 530 may pre-combine the signals obtained from UE #a to generate N_a combined signals, and pre-combine the signals obtained from UE #b to generate N_b combined signals.

The digital beamforming unit 530 according to an embodiment may transmit the pre-combined signals to the DU 550 over the fronthaul interface 540. For example, the digital beam forming unit 530 may transmit N combined signals to the DU 550 over the fronthaul interface 540.

The modem 560 according to various embodiments may process a signal obtained from the RU 500 and measure the reception quality of the signal. For example, for signals obtained from UE #a, the modem 560 may process N_a combined signals that have been pre-combined by the digital beamforming unit 530 in correspondence to the current Rx dimension, and measure the reception quality (SINR_a) of the processed signals. For example, for signals obtained from UE #b, the modem 560 may process N_b combined signals that have been pre-combined by the digital beamforming unit 530 in correspondence to the current Rx dimension, and measure the reception quality (SINR_b) of the processed signals.

The channel quality manager 570 according to various embodiments may determine an expected reception quality according to a target Rx dimension.

The channel quality manager 570 according to an embodiment may determine channel characteristics (e.g., channel model and/or electric field characteristics) for the signals obtained from UE #a and/or UE #b. For example, the channel quality manager 570 may determine the channel characteristics based on the reception quality (SINR_a) corresponding to UE #a and/or the reception quality (SINR_b) corresponding to UE #b obtained from the modem 560.

The channel quality manager 570 according to an embodiment may obtain an offset stored in the memory (not shown). For example, the channel quality manager 570 may obtain an offset table corresponding to channel characteristics of each of UE #a and/or UE #b.

The channel quality manager 570 according to an embodiment may determine the reception quality corresponding to the target Rx dimension based on the offset. For example, the channel quality manager 570 may determine the expected reception quality corresponding to the target Rx dimension by adding an offset value corresponding to the target Rx dimension to the reception quality at the current Rx dimension obtained from the modem 560.

For example, the channel quality manager 570 may determine the expected reception quality according to the target Rx dimension for UE #a, such as expected reception quality at target Rx dimension of M (SINR_a(N=M)), expected reception quality at target Rx dimension of M−1 (SINR_a(N=M−1)), expected reception quality at target Rx dimension of M−2 (SINR_a(N=M−2)).

For example, the channel quality manager 570 may determine the expected reception quality according to the target Rx dimension for UE #b, such as expected reception quality at target Rx dimension of M (SINR_a(N=M)), expected reception quality at target Rx dimension of M−1 (SINR_a(N=M−1)), expected reception quality at target Rx dimension of M−2 (SINR_a(N=M−2)).

Referring to FIG. 7B, a pre-scheduling unit 580 of the O-RAN system may obtain a reception quality corresponding to a target interface for each of UE #a and/or UE #b from the channel quality manager 570.

The pre-scheduling unit 580 according to various embodiments may pre-schedule resources according to the UE and target Rx dimension to output an expected throughput.

The pre-scheduling unit 580 according to an embodiment may pre-schedule a target Rx dimension and a frequency resource to UE #a and/or UE #b. In this case, the value obtained by summing the product of target Rx dimension (Rx dimension_a) and frequency resource for pre-scheduled UE #a and the product of target Rx dimension (Rx dimension_b) and frequency resource for pre-scheduled UE #b may be less than or equal to the interface bandwidth.

The pre-scheduling unit 580 according to an embodiment may determine an expected throughput for a pre-scheduled combination. For example, the pre-scheduling unit 580 may determine the expected throughput (Expected T-put) for UE #a and/or UE #b on the basis of the expected reception quality corresponding to the pre-scheduled target Rx dimension (e.g., MCS level based on expected SINR) and the size of the pre-scheduled resource block (resource block size). For instance, the pre-scheduling unit 580 may determine the sum of the expected throughputs for pre-scheduled UE #a and/or UE #b to be the expected throughput for the pre-scheduled combination. For example, the pre-scheduling unit 580 may determine an expected throughput for a pre-scheduled combination according to Equation 1.

The dimension selection unit 590 according to various embodiments may determine an optimal Rx dimension based on an expected throughput.

The dimension selection unit 590 according to an embodiment may determine an optimal Rx dimension of a signal in units of slots.

Based on a list of expected throughputs, the dimension selection unit 590 according to an embodiment may determine the combination with the highest expected throughput to be an optimal Rx dimension for UE #a and/or UE #b.

FIG. 8 is a flowchart for a DU to determine a reception quality based on a pre-scheduled Rx dimension according to an embodiment of the disclosure.

Referring to FIG. 8, at operation 810, a DU 550 according to various embodiments may determine the reception quality of a signal obtained at the current Rx dimension.

The DU 550 according to an embodiment may measure the reception quality of an obtained signal. As an example, for signals obtained from at least one UE, the DU 550 may process a combined signal that has been pre-combined in correspondence to the current Rx dimension, and measure the reception quality of the processed signal.

For example, the DU 550 may measure the reception quality of a received signal based on at least one method of RSRP for measuring signal strength by averaging the strength of reference signals belonging to a specific cell in a frequency band, RSSI, RSRQ for measuring reception quality based on a value obtained by dividing RSRP by RSSI, SNR for measuring the quality of a signal based on a ratio of received signal to noise, or SINR for measuring reception quality based on the ratio of interference and noise to the received signal.

At operation 820, the DU 550 according to various embodiments may correct a reception quality value based on a basic Rx dimension.

The DU 550 according to an embodiment may determine channel characteristics of an obtained signal. For example, the DU 550 may determine channel characteristics (e.g., channel model and/or electric field characteristics) for signals obtained from at least one UE. For example, the DU 550 may correct the reception quality measured for the signal obtained at the current Rx dimension based on the basic Rx dimension, and determine the channel characteristics based on the corrected reception quality value. For example, the DU 550 may determine the channel characteristics (e.g., weak electric field) based on the range (e.g., A) including the corrected reception quality value.

At operation 830, the DU 550 according to various embodiments may obtain an offset table based on the corrected reception quality value.

The DU 550 according to an embodiment may perform moving averaging or IIR filtering on the corrected reception quality value.

The DU 550 according to an embodiment may obtain an offset stored in the memory (not shown). For example, the DU 550 may obtain an offset table corresponding to the channel characteristics.

At operation 840, the DU 550 according to various embodiments may determine an expected reception quality for each target Rx dimension based on the offset table.

The DU 550 according to an embodiment may determine the expected reception quality corresponding to the target Rx dimension based on the offset. For example, the DU 550 may determine the expected reception quality corresponding to the target Rx dimension by adding an offset value corresponding to the target Rx dimension to the IIR-filtered reception quality value.

At operation 850, the DU 550 according to various embodiments may determine the MCS level for each target Rx dimension.

The DU 550 according to an embodiment may determine an expected MCS level corresponding to a target Rx dimension for at least one UE. For example, the DU 550 may determine the MCS level based on the expected reception quality (e.g., SINR) determined for each target Rx dimension. For example, the DU 550 may determine the MCS level by adding a channel correction value (e.g., outer-loop rate control (OLRC) offset) depending upon the success or failure of physical uplink shared channel (PUSCH) reception to an MCS mapping value corresponding to the expected reception quality.

Figure 9A:
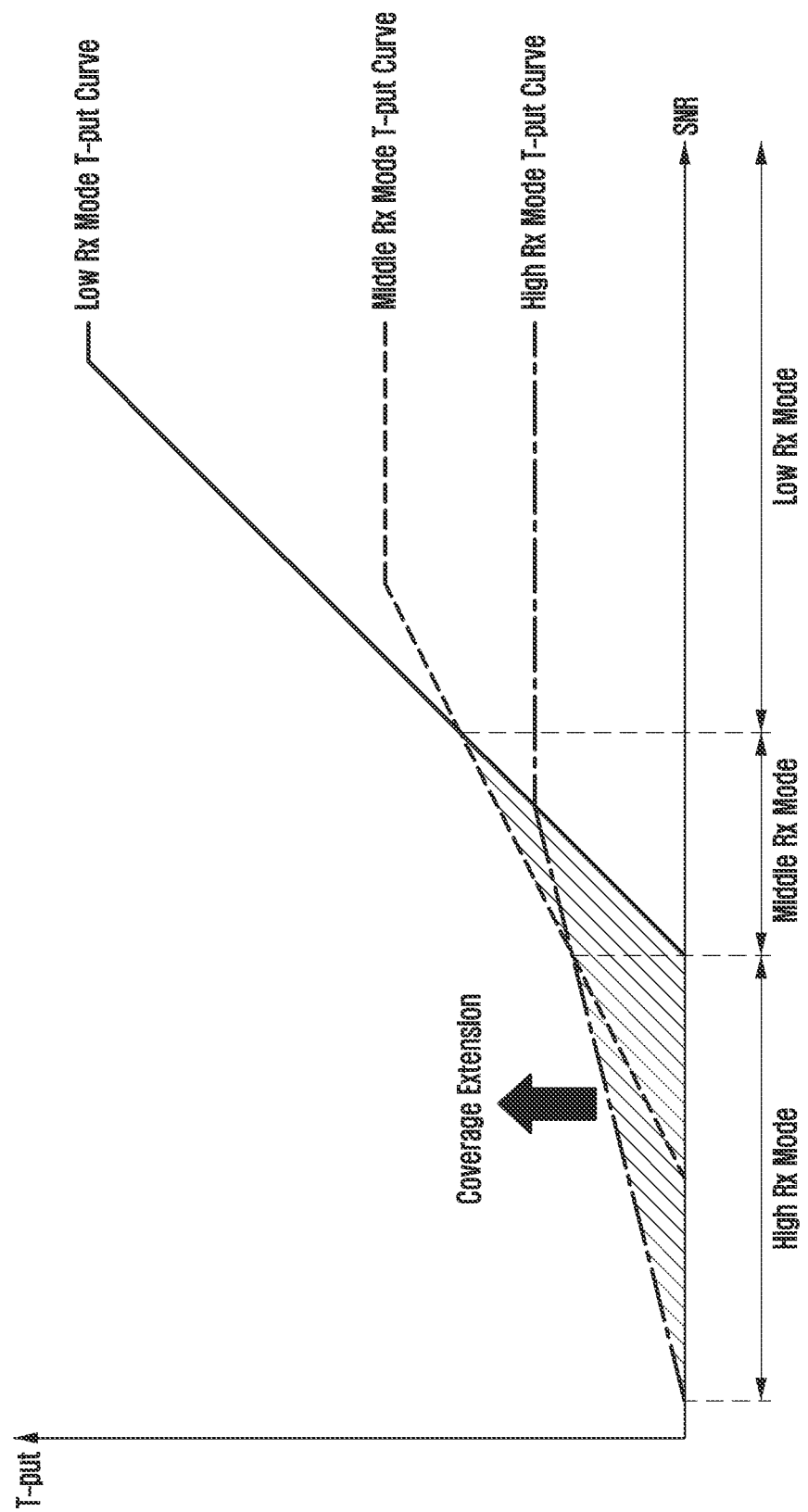
FIG. 9A is a chart showing throughputs corresponding to reception dimensions in an O-RAN system according to an embodiment of the disclosure.

FIG. 9A is a chart showing throughputs corresponding to Rx dimensions in an O-RAN system according to an embodiment of the disclosure.

In the chart shown, referring to FIG. 9A, the x-axis may represent an indicator (SNR, signal-to-noise ratio) related to reception performance, and the y-axis may represent throughput (T-put).

For example, referring to the throughput graph (Low Rx Mode T-put Curve) corresponding to a low Rx dimension mode, in a strong electric field (e.g., range in which the SNR value of the x-axis is high), a large number of frequency resources can be allocated, and a high MCS level can be obtained as the reception performance is high, so that a high maximum throughput can be achieved. On the other hand, in medium and weak electric fields (e.g., range in which the SNR value of the x-axis is low), the throughput may decrease as the reception performance decreases.

For example, referring to the throughput graph (Middle Rx Mode T-put curve) corresponding to a medium Rx dimension mode, in a strong electric field, the allocable frequency resources are reduced in comparison to the low Rx dimension mode, so that the maximum throughput can be lowered. On the other hand, in a medium electric field, the throughput may be increased as the reception performance increases in comparison to the low Rx dimension mode.

For example, referring to the throughput graph (High Rx Mode T-put Curve) corresponding to a high Rx dimension mode, the maximum throughput may be lowered due to a small amount of allocable frequency resources in a strong electric field, but the throughput may be increased due to high reception performance in a weak electric field.

Accordingly, the throughput may become higher by a hatched region (coverage extension) when the Rx dimension is dynamically changed according to a channel environment, such as weak electric field, medium electric field, and strong electric field, compared to when the Rx dimension is fixed.

Figure 9B:
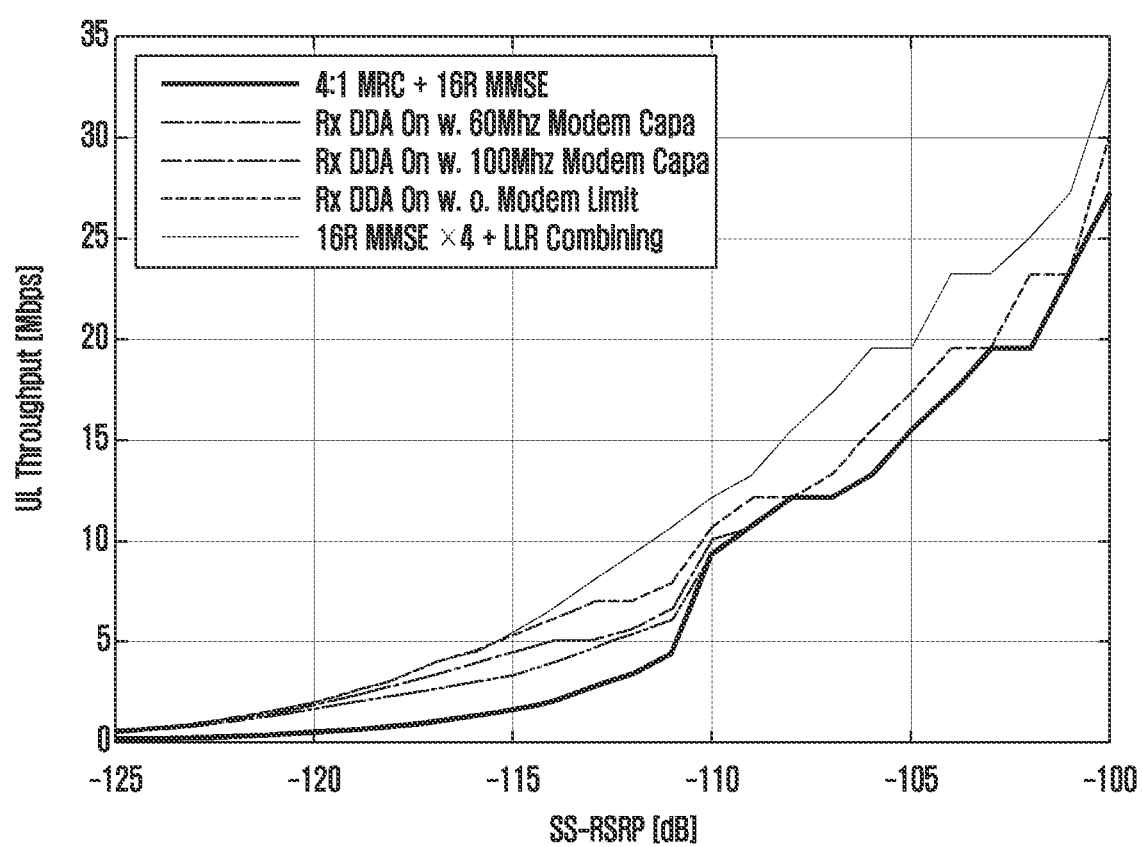
FIG. 9B is a chart showing throughputs corresponding to the types of O-RAN systems according to an embodiment of the disclosure.

FIG. 9B is a chart showing throughputs corresponding to the types of O-RAN systems according to an embodiment of the disclosure.

In the chart shown, referring to FIG. 9B, the x-axis may represent an indicator (e.g., secondary synchronization RSRP (SS-RSRP)) related to reception performance, and the y-axis may represent throughput (T-put). According to an embodiment, the system bandwidth may be 60 Mhz.

For example, the graph labeled 4:1 maximum ration combining (MRC)+16 R minimum mean-squared error (MMSE) may be a graph corresponding to an existing O-RAN system (functional split 7-2).

For example, the graph labeled Rx DDA on w. 60 Mhz Modem Capa may be a graph corresponding to the case where the fronthaul interface 540 has a capacity of 60 Mhz According to the graph, when the Rx dimension is doubled, the available frequency resources may be halved.

For example, the graph labeled Rx digital differential analyzer (DDA) on w. 100 Mhz Modem Capa may be a graph corresponding to the case where the fronthaul interface 540 has a capacity of 100 Mhz. According to the graph, even if the Rx dimension is doubled, the available frequency resources may be greater than ½ times.

For example, the graph labeled Rx DDA on w.o Modem Limit may be a graph corresponding to the case where all the capacity of the fronthaul interface 540 is used without limiting the modem processing capacity.

For example, the graph labeled 16 R MMSEx 4+log-likelihood ratio (LLR) combining may be a graph corresponding to a functional split 7-3 system.

An electronic device according to various embodiments includes: a communication module (e.g., fronthaul interface 540 in FIG. 5) to receive signals from at least one UE; and a processor (e.g., DU 550 in FIG. 5), wherein the processor (e.g., DU 550) may be configured to: determine the reception quality of a signal obtained through the communication module (e.g., fronthaul interface 540); obtain an offset corresponding to the channel characteristic of the signal; determine an expected reception quality corresponding to a target Rx dimension based on the offset indicating a signal quality difference corresponding to a difference between a Rx dimension at signal reception and the target Rx dimension, and the reception quality; pre-schedule the target Rx dimension and a frequency resource to the at least one UE; determine an expected throughput for the at least one UE based on the expected reception quality corresponding to the target Rx dimension and the size of the frequency resource; determine the target Rx dimension based on the expected throughput; and receive or transmit data from or to the UE through the determined target Rx dimension.

In the electronic device according to various embodiments, the processor (e.g., DU 550) may be configured to determine the channel characteristic of the signal based on the reception quality of the signal obtained through the communication module (e.g., fronthaul interface 540).

In the electronic device according to various embodiments, the processor (e.g., DU 550) may be configured to determine the expected reception quality corresponding to the target Rx dimension based on a value obtained by adding an offset corresponding to the target Rx dimension to the reception quality.

In the electronic device according to various embodiments, the processor (e.g., DU 550) may be configured to determine the reception quality based on a signal-to-interference-noise ratio (SINR) for the signal obtained through the communication module (e.g., fronthaul interface 540) and determine an MCS level corresponding to the target Rx dimension based on the SINR and the offset.

In the electronic device according to various embodiments, the processor (e.g., DU 550) may be configured to determine a transport block size (TBS) based on the MCS level corresponding to the target Rx dimension and the frequency resource, and calculate the expected throughput based on the TBS.

In the electronic device according to various embodiments, the communication module (e.g., fronthaul interface 540) may be configured to receive signals from a plurality of UEs, and the processor (e.g., DU 550) may be configured to pre-schedule plural combinations to the plurality of UEs, and determine the sum of throughputs corresponding to UEs of a combination to be the expected throughput of the combination.

In the electronic device according to various embodiments, the processor (e.g., DU 550) may be configured to identify a combination having the highest expected throughput and determine an optimal Rx dimension corresponding to the identified combination.

In the electronic device according to various embodiments, the processor (e.g., DU 550) may be configured to transfer information about the optimal Rx dimension to the radio unit (RU) through the communication module (e.g., fronthaul interface 540).

In the electronic device according to various embodiments, the processor (e.g., DU 550) may be configured to process the signal obtained through the communication module (e.g., fronthaul interface 540) based on the optimal Rx dimension.

In the electronic device according to various embodiments, the processor (e.g., DU 550) may be configured to determine the optimal Rx dimension in units of slots.

In the electronic device according to various embodiments, the processor (e.g., DU 550) may be configured to pre-schedule the same Rx dimension to the plurality of UEs.

An operation method of an electronic device according to various embodiments may include: determining the reception quality of a signal obtained through a communication module (e.g., fronthaul interface 540); obtaining an offset corresponding to the channel characteristic of the signal; determining an expected reception quality corresponding to a target Rx dimension based on the offset corresponding to the target Rx dimension and the reception quality; pre-scheduling the target Rx dimension and a frequency resource to at least one UE; determining an expected throughput for the at least one UE based on the expected reception quality corresponding to the target Rx dimension and the size of the frequency resource; and determining an optimal Rx dimension based on the expected throughput.

The operation method of the electronic device according to various embodiments may further include determining a channel characteristic of the signal based on the reception quality of the signal obtained through the communication module (e.g., fronthaul interface 540).

The operation method of the electronic device according to various embodiments may further include determining an expected reception quality corresponding to the target Rx dimension based on a value obtained by adding an offset corresponding to the target Rx dimension to the reception quality.

The operation method of the electronic device according to various embodiments may include: determining the reception quality based on a signal-to-interference-noise ratio (SINR) for the signal obtained through the communication module (e.g., fronthaul interface 540); and determining an MCS level corresponding to the target Rx dimension based on the SINR and the offset.

The operation method of the electronic device according to various embodiments may include: determining a transport block size (TBS) based on the MCS level corresponding to the target Rx dimension and the frequency resource; and calculating the expected throughput based on the TBS.

The operation method of the electronic device according to various embodiments may include: obtaining signals received through the communication module (e.g., fronthaul interface 540) from a plurality of UEs; pre-scheduling plural combinations to the plurality of UEs; and determining the sum of throughputs corresponding to UEs of a combination to be the expected throughput of the combination.

The operation method of the electronic device according to various embodiments may include: identifying a combination having the highest expected throughput; and determining an optimal Rx dimension corresponding to the identified combination.

The operation method of the electronic device according to various embodiments may further include transferring information about the optimal Rx dimension to the radio unit (RU) through the communication module (e.g., fronthaul interface 540).

The operation method of the electronic device according to various embodiments may further include processing the signal obtained through the communication module (e.g., fronthaul interface 540) based on the optimal Rx dimension.

The operation method of the electronic device according to various embodiments may include determining the optimal Rx dimension in units of slots.

The operation method of the electronic device according to various embodiments may include pre-scheduling the same Rx dimension to the plurality of UEs.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium (e.g., internal memory 136 or external memory 138) that is readable by a machine (e.g., the electronic device 101). For example, a processor (e.g., the DU 550) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A distributed unit (DU) comprising:
at least one processor; and
memory storing instructions that, when executed by the at least one processor, cause the DU to:
determine a channel quality of a signal obtained from at least one user equipment (UE) through a radio unit (RU);
determine expected throughputs of a plurality of candidate reception dimensions for interface between the DU and the RU, based on the channel quality;
determine a target reception dimension among the plurality of candidate reception dimensions, the target reception dimension having a greatest expected throughput among the determined expected throughputs; and
receive data from the at least one UE through the RU based on the determined target reception dimension.

2. The DU of claim 1, wherein each size of the candidate reception dimensions is smaller than a number of antennas of the RU to receive the data from the at least one UE.

3. The DU of claim 1,
wherein each of the expected throughputs is determined based on an offset applied to the determined channel quality, and
wherein the offset is identified in accordance with a difference between a corresponding candidate reception dimension and a current reception dimension.

4. The DU of claim 3,
wherein each of the expected throughputs comprises a transport block size (TBS),
wherein the TBS is determined based on a signal-to-interference-plus-noise ratio (SINR) and a modulation and coding scheme (MCS) level, and
wherein the SINR corresponds to a value obtained based on the channel quality and the offset.

5. The DU of claim 3,
wherein the offset is obtained from an offset table storing a value of an expected channel quality in accordance with each candidate reception dimension and the current reception dimension.

6. The DU of claim 1,
wherein the instructions, when executed by the at least one processor, cause the DU to:
pre-schedule a plurality of combinations for the at least one UE, and
determine a sum of throughputs corresponding to each of the combinations to be one of the expected throughputs.

7. The DU of claim 1, wherein the instructions, when executed by the at least one processor, cause the DU to transmit information on the target reception dimension to the RU through communication circuitry of the DU.

8. A method performed by a distributed unit (DU), the method comprising:
determining a channel quality of a signal obtained from at least one user equipment (UE) through a radio unit (RU);
determining expected throughputs of a plurality of candidate reception dimensions for interface between the DU and the RU, based on the channel quality;
determining a target reception dimension among the plurality of candidate reception dimensions, the target reception dimension having a greatest expected throughput among the determined expected throughputs; and
receiving data from the at least one UE through the RU based on the determined target reception dimension.

9. The of claim 8, wherein each size of the candidate reception dimensions is smaller than a number of antennas of the RU to receive the data from the at least one UE.

10. The method of claim 8,
wherein each of the expected throughputs is determined based on an offset applied to the determined channel quality, and
wherein the offset is identified in accordance with a difference between a corresponding candidate reception dimension and a current reception dimension.

11. The method of claim 10,
wherein each of the expected throughputs comprises a transport block size (TBS),
wherein the TBS is determined based on a signal-to-interference-plus-noise ratio (SINR) and a modulation and coding scheme (MCS) level, and
wherein the SINR corresponds to a value obtained based on the channel quality and the offset.

12. The method of claim 10,
wherein the offset is obtained from an offset table storing a value of an expected channel quality in accordance with each candidate reception dimension and the current reception dimension.

13. The method of claim 8, wherein the determining the expected throughputs comprises:
pre-scheduling a plurality of combinations for the at least one UE; and
determining a sum of throughputs corresponding to each of the combinations to be one of the expected throughputs.

14. The method of claim 8, further comprising:
transmitting information on the target reception dimension to the RU through communication circuitry of the DU.

15. A non-transitory computer readable storage medium storing instructions that, when executed by at least one processor, cause a distributed unit (DU) to perform operations including:
determining a channel quality of a signal obtained from at least one user equipment (UE) through a radio unit (RU);
determining expected throughputs of a plurality of candidate reception dimensions for interface between the DU and the RU, based on the channel quality;
determining a target reception dimension among the plurality of candidate reception dimensions, the target reception dimension having a greatest expected throughput among the determined expected throughputs; and
receiving data from the at least one UE through the RU based on the determined target reception dimension.

* * * * *